United States Patent Office 3,262,948
Patented July 26, 1966

3,262,948
21,21-ETHYLENE-PROGESTERONE AND PROCESS FOR THE PRODUCTION THEREOF
Hans-Günter Lehmann, Berlin, Germany, assignor to Schering AG, Berlin, Germany
No Drawing. Filed Jan. 21, 1964, Ser. No. 339,078
Claims priority, application Germany, Jan. 22, 1963, Sch 32,647
6 Claims. (Cl. 260—397.3)

The present invention relates to a process for the preparation of α,α-ethyleneketones and to certain α,α-ethyleneketones preparable by said process.

Only a few α,α-ethyleneketones are known in the art, such as the phenyl-cyclopropyl-ketone

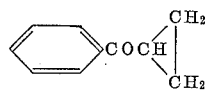

[W. J. Close, Jour. Am. Chem. Soc., 79, 1455 (1957)] and the so-called 16-spirocyclopropyltestosterone

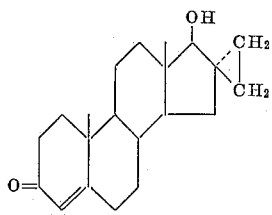

(V. Georgian and N. Kundu, Chemistry and Industry, October 6, 1962, page 1755), since the methods known in the prior art for their preparation are either inexpedient or unsuitable for general use (cf. column 5, I).

According to the present invention, a new process for the preparation of α,α-ethyleneketones of the formula

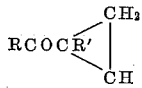

has been found, which process is of broad applicability. According to the present invention, gamma-keto-tetra-alkyl ammonium salts [1] of the formula

are reacted with dimethylsulfoxoniummethylide,

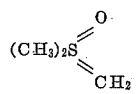

In the formulas, R is a univalent organic radical, and R' is hydrogen or a univalent organic radical. R and R' may be aliphatic, aromatic, araliphatic, isocyclic, or heterocyclic radicals, providing only that they be inert, i.e. unreactive with the dimethylsulfoxoniummethylide reagent. Although the radicals may be hydrocarbon materials, e.g. alkyl, aryl, aralkyl, and cycloalkyl materials, it will be evident from the examples herein that they are not limited to such materials.

R and R' taken together can also represent a divalent organic radical inert to dimethylsulfoxoniummethylide. This radical, taken together with the —COC— group, may form a 5- or 6-membered ring, which ring, in turn, may be part of a ring system, and, in particular, may be part of a steroid skeleton.

In the formulas, X is an anion of an organic or inorganic acid, suitably of a mineral acid such as sulfuric acid or one of the hydrohalic acids HF, HCl, HBr, HI.

The reaction between the gamma-keto-tetraalkyl ammonium salts and dimethylsulfoxoniummethylide proceeds on contact of the reagents in the presence of a base, conveniently at room temperature (about 20° C.), but also at temperatures of up to about 50° C. or at 0° C. or below. These temperatures are not critical. The maximum reaction temperature is determined by the decomposition of the reactants or products, and the minimum temperature by practical considerations of reaction velocity and reaction time, as will be well understood by those skilled in the art.

As bases, alkali metal hydrides and hydroxides are employed, such as lithium, sodium, and potassium hydrides and hydroxides.

The proportions in which the reagents are present is not critical. The materials react in theory in a 1:1 molar ratio, and deviation from the ratio merely indicates an excess of one or the other reagent. From a practical viewpoint, the use of a 10–20 percent excess of dimethylsulfoxoniummethylide by weight of the amount theoretically required is recommended for optimum utilization of the ammonium salt reactant.

The reaction suitably proceeds in an aprotic solvent such as dimethylsulfoxide or dimethylformamide.

The dimethylsulfoxoniummethylide is conveniently prepared from trimethylsulfonium salts of the formula $$(CH_3)_3S^+=OX^-$$

[cf. E. J. Corey and M. Chaykovsky, Jour. Am. Chem. Soc. 84, 867–868 (1962)] by the addition of a base such as an alkali metal hydride. The base employed in this synthesis can be used as the base for the principal reaction when present in excess.

The reagents of the invention are sensitive to atmospheric oxygen and moisture. For highest yields conventional techniques may be employed to minimize side reactions, such as keeping the gas volume over the reactants as small as feasible, or by using atmospheres of inert gases (nitrogen, argon, etc.). Although the reaction conveniently proceeds at atmospheric pressure, subatmospheric pressures can be used to minimize reactions with atmospheric oxygen or moisture.

The reaction products, particularly those of the steroid series, can be used as medicaments or as starting materials [2] for the preparation of medicaments. For example, the compounds prepared in following Examples 5 and 6 can be converted by oxidation into the corresponding 3-keto-Δ⁴-unsaturated compounds (cf. Example 5). These latter compounds are antagonists of aldosterone, and effect a decrease in the sodium retention activity of aldosterone.

A better understanding of the present invention and of its many advantages will be had by referring to the following specific examples given by way of illustration.

*Example 1* [3]

13.2 g. of trimethylsulfoxoniumiodide were dissolved in 80 ml. of dimethylsulfoxide. 2.68 g. of sodium hydride were added, and the mixture was stirred for 15 minutes under nitrogen. This was then combined with 16 g. of trimethyl-(β-benzoylethyl)-ammonium iodide, $C_6H_5COCH_2CH_2N(CH_3)_3$ I, M.P. 209–212° C. (decompn.), in several portions, and the mixture was stirred for 5 hours under nitrogen at room temperature. It was then poured in water and extracted with ether. The ether extract was washed with water, and dried. The ether was then removed in vacuum and the residue was ---
[1] These salts are obtainable from the correspondent ketone RCOCH₂R′, CH₂O and (CH₃)₂NH·HX by Mannich-reaction and quaternization with CH₃X.

[2] Cf. column 5, II.
[3] In the same manner as described in Example 1, there is obtained from trimethyl-(β-acetylethyl)-ammonium iodide, M.P. 180–185° C., methyl-cyclopropylketone.

vacuum distilled. Phenyl-cyclopropylketone having a boiling point of 115° C. at 12 mm. Hg was obtained.

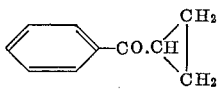

Example 2

8.8 g. of trimethylsulfoxoniumiodide were dissolved in 80 ml. dimethylsulfoxide. 1.96 g. of sodium hydride was added, and the mixture was stirred for 15 minutes under nitrogen. 9 g. of trimethyl-(2-oxocyclohexylmethyl)-ammonium iodide

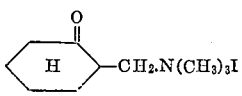

dissolved in 80 ml. of dimethylformamide, were added dropwise over 30 minutes. The mixture was stirred for 5 hours under nitrogen at room temperature and poured in water. The organic phase was obtained in dry ether, the ether was removed under vacuum, and the residue was submitted to vacuum distillation. Spiro [2,5]-octane-4-one,

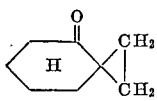

having a boiling point of 68–70° C. at 15 mm. Hg was obtained.

Example 3

5.28 g. of trimethylsulfoxoniumiodide were dissolved in 40 ml. of dimethylsulfoxide. 1.12 g. of sodium hydride were added, and the mixture was stirred for 15 minutes under nitrogen. 9.54 g. of trimethyl-(17β-hydroxy-3-oxo-5α-androstane-2α-ylmethyl)-ammonium iodide,

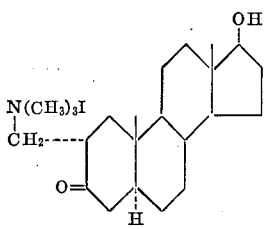

M.P. 232–234° C. (decompn.), dissolved in dimethylformamide, were added dropwise over a period of 30 minutes, and the mixture stirred for 5 hours at room temperature under nitrogen. The mixture was poured into water. Solids were filtered off, washed with water, then dried and recrystallized from acetic ester. 2.2 g. of 2,2-ethylene-5α-androstane-17-ol-3-one,

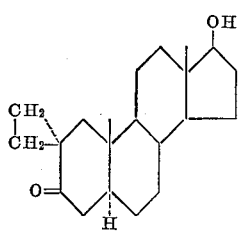

(M.P. 149.5°–150° C.) were obtained.

Example 4

2.64 g. of trimethylsulfoxoniumiodide were dissolved in 50 ml. of dimethylsulfoxide, combined under nitrogen with 0.53 g. of sodium hydride, and stirred for 15 minutes at room temperature under nitrogen. 4.88 g. of trimethyl-(3β-hydroxy-17-oxo-Δ⁵-androstene-16α-ylmethyl)-ammonium iodide,

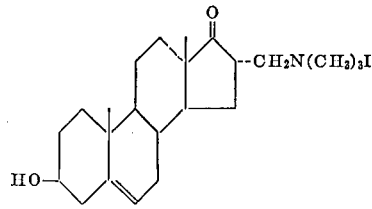

M.P. 233–234° C. (decompn.), were dissolved in 30 ml. of dimethylformamide. The latter solution was added dropwise over 30 minutes into the previously mentioned mixture, and the combination was stirred for a further 5 hours under nitrogen at room temperature. The mixture was poured into water, and the precipitate was filtered off, washed with water, and dried. 3.1 g. of crude 16,16-ethylene-Δ⁵-androstene-3β-ol-17-one

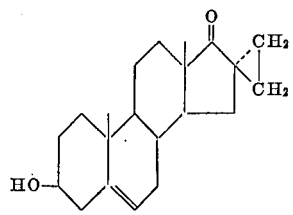

were obtained. For analysis, the compound is extracted with ether or recrystallized from acetic ester. M.P. 171–173.5° C.

Example 5

5 g. of trimethylsulfoxoniumiodide were dissolved in 200 ml. dimethylsulfoxide, combined under nitrogen with 1 g. sodium hydride, and stirred under nitrogen for 25 minutes. 10.3 g. of trimethyl-(3β-hydroxy-20-oxo-Δ⁵-pregnene-21-ylmethyl)-ammonium iodide, M.P. 223–233° C. (decompn.), were added thereto in 4 portions, and the mixture stirred for 15 hours at room temperature with the introduction of nitrogen. Solids were precipitated with ice water acidified with acetic acid, and were then filtered off, washed with water, dried, and chromatographed on silica gel. 38% of 21,21-ethylene-Δ⁵-pregnene-3β-ol-20-one were eluted with methylene chloride containing 10% of acetic ester. M.P. 164–165° C. By recrystallization from acetic ester, the melting point was not changed.

1 g. of 21,21-ethylene-Δ⁵-pregnene-3β-ol-20-one was heated for 1 hour under reflux with 100 ml. of absolute toluene, 10 ml. cyclohexanone, and 2 g. of aluminum isopropylate. The mixture was cooled and water and ether were added. It was then acidified with 1 N $H_2SO_4$, and extracted. The organic phase was washed with 1 N $H_2SO_4$, water, and a solution of bicarbonate. It was then reduced in volume and the cyclohexanone was removed by steam distillation. The residue was taken up in acetic ester, dried with sodium sulfate, and concentrated. 0.58 g. of 21,21-ethylene-Δ⁴-pregnene-3,20-dione were obtained having a melting point of 156–157° C.

Example 6

2.5 g. of trimethylsulfoxoniumiodide were dissolved in 100 ml. of dimethylsulfoxide, combined under nitrogen with 0.5 g. of sodium hydride, and stirred for 25 minutes. 5.73 g. of trimethyl-(3β-acetoxy-17α-hydroxy-20-oxo-Δ⁵-pregnene-21-ylmethyl)-ammonium iodide were added thereto, and the mixture was stirred for 15 hours at room temperature with the introduction of nitrogen. Solids were precipitated with ice water acidified with acetic acid, were filtered off, washed with water, dried, and chromatographed on silica gel. 1.33 g. of 21,21-ethylene-Δ⁵-pregnene-3β,17α-diol-20-one-3-acetate (M.P. 202–203° C. after recrystallization from acetic ester) and 1.24 g. of 21,21-ethylene-Δ⁵-pregnene-3β,17α-diol-20-one (M.P. 255–258° C. after washing with acetone) were obtained.

I. Known methods for the manufacture of α,α-ethyleneketones:

(1) Freer and Perkins, Chem. Soc. 51, 820 (1887).
(2) P. Bruylants, Rec. trav. chim. Pays-Bas 28, 180 (1909).
(3) N. D. Zelinsky and E. F. Dengin, Ber. dtsch. chem. Ges., 55, 3354 (1922).
(4) V. Georgian, N. Kundu, Chem. & Ind. (1962), 1755.

II:
(1) U.S. Pat. 2,883,423 (Apr. 21, 1959)
(2) U.S. Pat. 2,969,374 (Jan. 24, 1961)
(3) British Pat. 722,679 (Jan. 26, 1955)
(4) British Pat. 798,703 (Aug. 23, 1958)
(5) German Pat. 1,090,129 (Oct. 6, 1960)

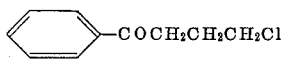

can be prepared from

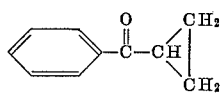

and HCl.

What is claimed is:

1. A process for preparing α,α-ethyleneketones of the formula

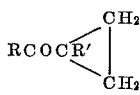

which comprises reacting a gamma-keto-tetraalkyl ammonium salt of the formula

with dimethylsulfoxoniummethylide in an aprotic solvent selected from the group consisting of dimethylsulfoxide and dimethylformamide in the presence of a base, wherein R when taken alone is selected from the group consisting of methyl, phenyl, and a univalent radical of a pregnane derivative, R' when taken alone is hydrogen, and R and R' when taken together are a divalent organic radical which, togther with the group —COC—, forms a member of the group consisting of a cyclohexanonyl ring and a univalent radical of an androstane derivative, and wherein X is an acid anion.

2. A process as in claim 1 wherein said base is a member selected from the group consisting of alkali metal hydrides and hydroxides.

3. A process as in claim 1 wherein said dimethylsulfoxoniummethylide is prepared by adding an excess of an alkali metal hydride to a trimethylsulfoxonium salt in said aprotic solvent, and then combining the resulting mixture containing said excess hydride with said gamma-keto-tetraalkyl ammonium salt.

4. 21,21-ethylene-Δ$^5$-3β-ol-21-one.
5. 21,21-ethylene-Δ$^4$-pregnene-3,20-dione.
6. 21,21-ethylene-Δ$^5$-pregnene-3β,17α-diol-20-one.

References Cited by the Examiner

Georgian et al.: "Chemistry and Industry" (1962), pages 1755–1756 relied on.

LEWIS GOTTS, *Primary Examiner.*

ELBERT L. ROBERTS, *Examiner.*